(12) United States Patent
Karp

(10) Patent No.: US 6,811,695 B2
(45) Date of Patent: Nov. 2, 2004

(54) MICROFLUIDIC FILTER

(75) Inventor: Christoph D. Karp, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 29 days.

(21) Appl. No.: 10/145,968

(22) Filed: May 13, 2002

(65) Prior Publication Data

US 2002/0185431 A1 Dec. 12, 2002

Related U.S. Application Data

(60) Provisional application No. 60/296,882, filed on Jun. 7, 2001, and provisional application No. 60/296,897, filed on Jun. 7, 2001.

(51) Int. Cl.$^7$ ............................................. B01D 63/08
(52) U.S. Cl. ............... 210/321.6; 137/833; 210/321.84; 210/506; 422/101
(58) Field of Search .................. 210/321.6, 321.61, 210/321.75, 321.84, 490, 506, 500.22, 500.26, 500.27, 500.29, 511, 634; 137/833; 204/450, 451, 600, 601; 366/336–341; 422/100, 101, 129; 428/166

(56) References Cited

U.S. PATENT DOCUMENTS

| | | | |
|---|---|---|---|
| 4,676,274 A | 6/1987 | Brown | 137/806 |
| 4,946,795 A | 8/1990 | Gibbons et al. | 436/179 |
| 5,039,493 A | 8/1991 | Oprandy | 422/101 |
| 5,304,487 A * | 4/1994 | Wilding et al. | 435/29 |
| 5,585,011 A * | 12/1996 | Saaski et al. | 216/2 |
| 5,635,358 A | 6/1997 | Wilding et al. | 435/7.2 |
| 5,640,995 A | 6/1997 | Packard et al. | 137/597 |
| 5,839,467 A | 11/1998 | Saaski et al. | 137/501 |
| 5,872,010 A | 2/1999 | Karger et al. | 436/173 |
| 5,922,591 A | 7/1999 | Anderson et al. | 435/287.2 |
| 5,948,255 A * | 9/1999 | Keller et al. | 210/321.84 |
| 6,030,581 A | 2/2000 | Virtanen | 422/68.1 |
| 6,043,080 A | 3/2000 | Lipshutz et al. | 435/287.2 |
| 6,074,725 A | 6/2000 | Kennedy | 428/188 |
| 6,352,577 B1 | 3/2002 | Martin et al. | 96/4 |
| 6,387,290 B1 | 5/2002 | Brody et al. | 216/99 |
| 6,494,614 B1 * | 12/2002 | Bennett et al. | 366/336 |
| 6,537,506 B1 | 3/2003 | Schwalbe et al. | 422/130 |
| 6,645,432 B1 * | 11/2003 | Anderson et al. | 422/100 |

FOREIGN PATENT DOCUMENTS

| | | |
|---|---|---|
| DE | 197 39 722 A1 | 4/1999 |
| WO | WO 98/04909 A1 | 2/1998 |
| WO | WO 99/09042 | 2/1999 |
| WO | WO 99/19717 | 4/1999 |
| WO | WO 99/33559 | 7/1999 |
| WO | wo 99/60397 | 11/1999 |
| WO | WO 00/21659 | 4/2000 |
| WO | WO 00/72970 A1 | 12/2000 |

OTHER PUBLICATIONS

Berna, M., et al., *Collection, Storage, and Filtration of in Vivo Study Samples Using 96–Well Filter Plates To Facilitate Automated Sample Preparation and LC/MS/MS Analysis*, "Analytical Chemistry," vol. 74, No. 5, Mar. 1, 2002, pp. 1197–1201.

Gravesen, Peter, et al., *Microfluidics—a review*, "J. Micromech. Microeng.," 3 (1993), pp. 168–182.

* cited by examiner

*Primary Examiner*—Joseph Drodge
(74) *Attorney, Agent, or Firm*—Vincent K. Gustafson; Michael F. Labbee

(57) ABSTRACT

Multi-layer microfluidic devices incorporating a filter element are provided. A filter element is compressively restrained between device layers, such that the compression promotes a tight seal between device layers and resists fluid leakage around the filter element.

32 Claims, 1 Drawing Sheet

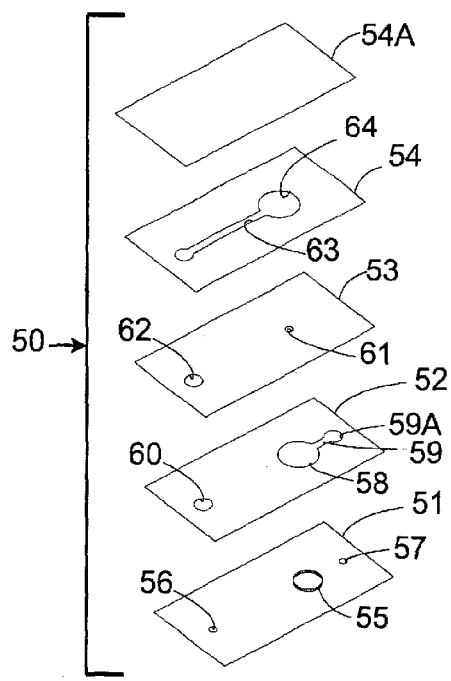
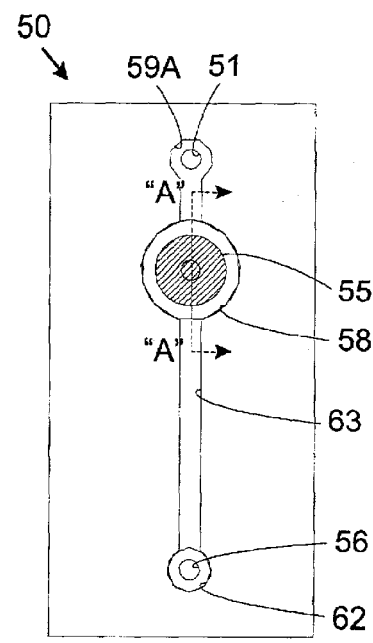
FIG. 1A     FIG. 1B
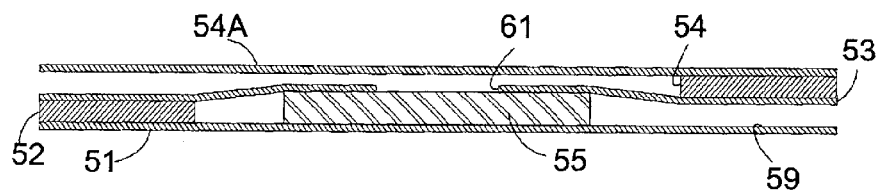
FIG. 1C

MICROFLUIDIC FILTER

STATEMENT OF RELATED APPLICATION(S)

This application claims priority to two U.S. Provisional Patent Application Ser. No. 60/296,882, filed Jun. 7, 2001 and currently pending; and Ser. No. 60/296,897, filed Jun. 7, 2001 and currently pending.

FIELD OF THE INVENTION

The present invention relates to filters for use in microfluidic devices and methods for their use and manufacture.

BACKGROUND OF THE INVENTION

There has been a growing interest in the manufacture and use of microfluidic systems for the acquisition of chemical and biological information. In particular, when conducted in microfluidic volumes, complicated biochemical reactions may be carried out using very small volumes of liquid. Among other benefits, microfluidic systems increase the response time of reactions, minimize sample volume, and lower reagent consumption. When volatile or hazardous materials are used or generated, performing reactions in microfluidic volumes also enhances safety and reduces disposal quantities.

Traditionally, microfluidic devices have been constructed in a planar fashion using techniques that are borrowed from the silicon fabrication industry. Representative systems are described, for example, in some early work by Manz et al. (Trends in Anal. Chem. (1990) 10(5): 144–149; Advances in Chromatography (1993) 33: 1–66). In these publications, microfluidic devices are constructed by using photolithography to define channels on silicon or glass substrates and etching techniques to remove material from the substrate to form the channels. A cover plate is bonded to the top of the device to provide closure. Miniature pumps and valves can also be constructed to be integral (e.g., within) such devices. Alternatively, separate or off-line pumping mechanisms are contemplated.

More recently, a number of methods have been developed that allow microfluidic devices to be constructed from plastic, silicone or other polymeric materials. In one such method, a negative mold is first constructed, and plastic or silicone is then poured into or over the mold. The mold can be constructed using a silicon wafer (see, e.g., Duffy et al., Analytical Chemistry (1998) 70: 4974–4984; McCormick et. al., Analytical Chemistry (1997) 69: 2626–2630), or by building a traditional injection molding cavity for plastic devices. Some molding facilities have developed techniques to construct extremely small molds. Components constructed using a LIGA technique have been developed at the Karolsruhe Nuclear Research center in Germany (see, e.g., Schomburg et al., Journal of Micromechanical Microengineering (1994) 4: 186–191), and commercialized by Micro-Parts (Dortmund, Germany). Jenoptik (Jena, Germany) also uses LIGA and a hot-embossing technique. Imprinting methods in PMMA have also been demonstrated (see, Martynova et al., Analytical Chemistry (1997) 69: 4783–4789) However, these techniques do not lend themselves to rapid prototyping and manufacturing flexibility. Additionally, the foregoing references teach only the preparation of planar microfluidic structures. Moreover, the tool-up costs for both of these techniques are quite high and can be cost-prohibitive.

Various conventional tools and combinations of tools are used when analyzing or synthesizing chemical or biological products in conventional macroscopic volumes. Such tools include, for example: metering devices, reactors, valves, heaters, coolers, mixers, splitters, diverters, cannulas, filters, condensers, incubators, separation devices, and catalyst devices. Attempts to perform chemical or biological synthesis in microfluidic volumes have been stifled by difficulties in making tools for synthesis at microfluidic scale and then integrating such tools into microfluidic devices. Additionally, difficulties in rapidly prototypic microfluidic devices are compounded by attempts to incorporate multiple synthesis tools for multi-step synthesis.

One particular difficulty is filtering fluids within microfluidic devices. Microfluidic devices have channels that are, by definition, very small—typically having at least one dimension less than five hundred microns. A consequence of these small dimensions is the difficulty of inserting discrete elements into a microfluidic structure. For example, a typical microfluidic device may be constructed from micromachined or etched silicon (as discussed above), polymeric stencil layers (as discussed below), or any other suitable material. One characteristic of these materials is that they are not generally porous. Thus, in order to perform a filtering function, a porous material (providing the desired filtration properties or characteristics) must be inserted into the microfluidic structure of the device at the appropriate location. Of course, because the dimensions of the microfluidic structures are so small, any such filter material to be inserted into a device may be small and fragile, making assembly processes delicate and consequently less efficient. Moreover, it has been found that filter elements inserted into, for example, a channel, are difficult to seal. As a result, some fluid tends to pass around the filter rather than through it, impairing the performance of the device.

Thus, it would be desirable to provide a filter for microfluidic devices that is easy to assemble. It is also desirable to provide a filter for microfluidic devices that seals tightly and prevents fluid from passing around, rather than through, the filter element.

SUMMARY OF THE INVENTION

In a first aspect of the invention, a multi-layer microfluidic device comprises a microfluidic inlet channel and a microfluidic outlet channel having a first height. A device layer is disposed between the inlet channel and the outlet channel. The device layer defines an aperture. A filter element having a second height is disposed in the microfluidic outlet channel below the aperture. The height of the filter is greater than the height of the outlet channel.

In another aspect of the invention, a multi-layer microfluidic device comprises a first device layer defining a microfluidic inlet channel. A second device layer defines a microfluidic outlet channel. The second device layer has a first thickness. A third device layer is disposed between the first device layer and the second device layer. The third device layer defines an aperture. A filter element is disposed substantially within the second device layer below the aperture. The filter element has a second thickness. The height of the filter is greater than the height of the second device layer.

In another aspect of the present invention, a multi-layer microfluidic device comprises a first device layer defines a first channel. A second device layer defines a second channel. A filter element is compressively fixed between the first channel and the second channel. The first channel, the second channel and the filter element are in fluid communication to define a fluid flow path. Substantially all of the fluid flow path traverses the filter element.

BRIEF DESCRIPTION OF THE DRAWINGS

FIG. 1A is an exploded perspective view of microfluidic device with a filter in accordance with one aspect of the invention.

FIG. 1B is a top view of the device of FIG. 1A.

FIG. 1C is a side cross-sectional view of a portion of the device of FIGS. 1A-1B taken along line "A"—"A".

DETAILED DESCRIPTION

Definitions

The term "channel" as used herein is to be interpreted in a broad sense. Thus, the term "channel" is not intended to be restricted to elongated configurations where the transverse or longitudinal dimension greatly exceeds the diameter or cross-sectional dimension. Rather, the term is meant to include a conduit of any desired shape or configuration through which liquids may be directed. A channel may be filled with one or more materials.

The term "microfluidic" as used herein is to be understood, without any restriction thereto, to refer to structures or devices through which fluid(s) are capable of being passed or directed, wherein one or more of the dimensions is less than 500 microns.

The term "stencil" as used herein refers to a material layer or sheet that is preferably substantially planar, through which one or more variously shaped and oriented channels have been cut or otherwise removed through the entire thickness of the layer, thus permitting substantial fluid movement within the layer (as opposed to simple through-holes for transmitting fluid through one layer to another layer). The outlines of the cut or otherwise removed portions form the lateral boundaries of microstructures that are completed when a stencil is sandwiched between other layers, such as substrates and/or other stencils. Stencil layers can be flexible, thus permitting one or more layers to be manipulated so as not to lie in a plane.

Fabrication of Microfluidic Structures

In an especially preferred embodiment, microfluidic devices according to the present invention are constructed using stencil layers or sheets to define channels for transporting fluids. A stencil layer is preferably substantially planar and has one or more microstructures such as channels cut through the entire thickness of the layer. For example, a computer-controlled plotter modified to manipulate a cutting blade may be used. Such a blade may be used either to cut sections to be detached and removed from the stencil layer, or to fashion slits that separate regions in the stencil layer without removing any material. Alternatively, a computer-controlled laser cutter may be used to cut patterns through the entire thickness of a material layer. While laser cutting may be used to yield precisely-dimensioned microstructures, the use of a laser to cut a stencil layer inherently removes some material. Further examples of methods that may be employed to form stencil layers include conventional stamping or die-cutting technologies. Any of the above-mentioned methods for cutting through a stencil layer or sheet permits robust devices to be fabricated quickly and inexpensively compared to conventional surface micromachining or material deposition techniques used by others to produce fluidic microstructures.

After a portion of a stencil layer is cut or removed, the outlines of the cut or otherwise removed portions form the lateral boundaries of microstructures that are completed upon sandwiching a stencil between substrates and/or other stencils. Upon stacking or sandwiching the device layers together, the upper and lower boundaries of a microfluidic channel within a stencil layer are formed from the bottom and top, respectively, of adjacent stencil or substrate layers. The thickness or height of microstructures such as channels can be varied by altering the thickness of a stencil layer, or by using multiple substantially identical stencil layers stacked on top of one another. When assembled in a microfluidic device, the top and bottom surfaces of stencil layers are intended to mate with one or more adjacent stencil or substrate layers to form a substantially sealed device, typically having one or more fluid inlet ports and one or more fluid outlet ports. A stencil layer and surrounding stencil or substrate layers may be bonded using any appropriate technique.

The wide variety of materials that may be used to fabricate microfluidic devices using sandwiched stencil layers include polymeric, metallic, and/or composite materials, to name a few. In especially preferred embodiments, however, polymeric materials are used due to their inertness and each of manufacture.

When assembled in a microfluidic device, the top and bottom surfaces of stencil layers may mate with one or more adjacent stencil or substrate layers to form a substantially sealed device. In one embodiment, one or more layers of a device may be fabricated from single- or double-sided adhesive tape, although other methods of adhering stencil layers may be used. A portion of the tape (of the desired shape and dimensions) can be cut and removed to form microstructures such as channels. A tape stencil can then be placed on a supporting substrate with an appropriate cover layer, between layers of tape, or between layers of other materials. In one embodiment, stencil layers can be stacked on each other. In this embodiment, the thickness or height of the channels within a particular stencil layer can be varied by varying the thickness of the stencil layer (e.g., the tape carrier and the adhesive material thereon) or by using multiple substantially identical stencil layers stacked on top of one another. Various types of tape may be used with such an embodiment. Suitable tape carrier materials include but are not limited to polyesters, polycarbonates, polytetrafluoroethlyenes, polypropylenes, and polyimides. Such tapes may have various methods of curing, including curing by pressure, temperature, or chemical or optical interaction. The thicknesses of these carrier materials and adhesives may be varied. As an alternative to using tape, an adhesive layer may be applied directly to a non-adhesive stencil or surrounding layer. Examples of adhesives that might be used, either in standalone form or incorporated into self-adhesive tape, include rubber-based adhesives, acrylic-based adhesives, gum-based adhesives, and various other types.

Notably, stencil-based fabrication methods enable very rapid fabrication of robust microfluidic devices, both for prototyping and for high-volume production. Rapid prototyping is invaluable for trying and optimizing new device designs, since designs may be quickly implemented, tested, and (if necessary) modified and further tested to achieve a desired result. The ability to prototype devices quickly with stencil fabrication methods also permits many different variants of a particular design to be tested and evaluated concurrently.

In another preferred embodiment, microfluidic devices according to the present invention are fabricated from materials such as glass, silicon, silicon nitride, quartz, or similar materials. Various conventional surface machining or surface micromachining techniques such as those known in the semiconductor industry may be used to fashion channels, vias, and/or chambers in these materials. For example, techniques including wet or dry etching and laser ablation may be used. Using such techniques, channels may be made into one or more surfaces of a first substrate. A second set of channels may be etched or created in a second substrate. The two substrates are then adhered or otherwise fastened together in such as way that the channels surfaces are facing one another and certain regions may be overlapped to promote mixing.

Still further embodiments may be fabricated from various materials using well-known techniques such as embossing, stamping, molding, and soft lithography. Additionally, in yet another embodiment, the layers are not discrete, but instead a layer describes a substantially planar section through such a device. Such a microfluidic device can be constructed using photopolymerization techniques such as those described in Cumpston, et al. (1999) Nature 398:51–54.

In addition to the use of adhesives or single- or double-sided tape discussed above, other techniques may be used to attach one or more of the various layers of microfluidic devices useful with the present invention, as would be recognized by one of ordinary skill in attaching materials. For example, attachment techniques including thermal, chemical, or light-activated bonding; mechanical attachment (including the use of clamps or screws to apply pressure to the layers); or other equivalent coupling methods may be used.

Preferred Embodiments

In one embodiment providing filtering utility, a microfluidic filtering device is specially constructed to minimize leakage around a filter. Referring to FIGS. 1A-1B, a microfluidic device 50 is composed of five device layers. Starting at the bottom of FIG. 1A, a first device layer 51 supports a filter element 55 and defines an inlet port 56 and an outlet port 57. The second device layer 52 is a stencil layer that defines a chamber 58 having larger lateral dimensions than the filter element 55, but the device layer 52 has a thickness that is smaller than the height of the filter element 55. The second device layer 52, which is preferably made from a polymeric material, further defines a channel 59 and enlarged end 59A in fluid communication with the outlet port 57, and a via 60 in fluid communication with the inlet port 56. The third device layer 53, which is preferably made of a flexible polymeric material, defines a third device layer aperture 61 that is substantially centrally located atop the filter element 55 but is smaller in size than the filter element 55. Because the height of the filter 55 is greater than the height of the second device layer 52 that forms the chamber 58, the third device layer 53 above the filter 55 is pressed tightly against the filter 55. The third device layer 53 also defines a via 62. The fourth device layer 54, which may be made from a polymeric material, defines a channel 63 terminating at a fourth layer aperture 64 that is adjacent to, and preferably larger than, the third device layer aperture 61. The channel 63 may also be enlarged at the inlet side to mate with the via 62 in the third device layer 53.

The assembled device 50 is shown in FIG. 1B, a portion of which (along section lines "A—A") is shown in sectional view in FIG. 1C. In operation, fluid enters the device 50 through the inlet port 56, then passes through vias 60, 62 into the fourth device layer channel 63 and into the fourth device layer aperture 64. From the fourth device layer aperture 64, fluid flows into the third device layer aperture 61 and is then forced through the filter 55. The third device layer aperture 61 essentially determines the functional area of the filter 55, and the size of this aperture 61 can be varied accordingly.

Upon exiting the filter 55, fluid flows through the second device layer channel 59 and enlarged end 59A to the outlet port 57. Accordingly, all fluid flowing through the device 50 traverses the filter 55. The configuration of the device 50 prevents leakage in two ways: First, the device layer 53 above the filter 55 is tight against it, thus forming a compression seal. Second, the fluid pressure that builds up to push fluid through the filter 55 also pushes the device layer 53 even tighter against the filter 55, thus reinforcing the compression seal.

The filter 55 may be fabricated from paper, polymer, glass fiber or any other suitable material that provides the desired filtration characteristics. Filter materials are well understood in the art and readily may be selected by one skilled in the art to provide particular results. Preferably, the material of filter 55 would allow fluid to flow through the element in any direction, i.e., the filter is multi-directional. In other words, fluid entering the filter 55 vertically through the aperture 61 preferably may translate laterally into channel 59. The material used in filter 55 also is preferably thicker than the device layer 52, to provide the desired compression seal described above. Moreover, the material is preferably sufficiently incompressible so as to resist the force applied by device layer 53, thereby forming the desired compression seal discussed above.

The filter 55 also may be treated with or made from materials selected to achieve particular results, such as binding particular species. For example, it is well known that DNA has an affinity to and tends to bind to nylon. Thus, a filter may be fabricated from or coated with nylon to promote filtration of DNA from the fluid. Other desirable filter materials, coatings and/or coatings/treatments are well known in the art and may be selected as suitable for particular needs by one skilled in the art.

While the particular filter and surrounding chamber illustrated in FIGS. 1A-1C are illustrated as circular in shape, other shapes may be used. In other words, the foregoing design is by no means limited to filter materials and chambers that are circular in shape.

It is to be understood that the illustrations and descriptions of views of individual microfluidic tools, devices and methods provided herein are intended to disclose components that may be combined in a working device. Various arrangements and combinations of individual tools, devices, and methods provided herein are contemplated, depending on the requirements of the particular application. The particular microfluidic tools, devices, and methods illustrated and described herein are provided by way of example only, and are not intended to limit the scope of the invention.

What is claimed is:

1. A microfluidic device comprising:
   a first substantially planar device layer defining a microfluidic inlet channel;
   a second substantially planar device layer defining a microfluidic outlet channel, the outlet channel, having a first height;
   a third device layer disposed between the first device layer and the second device layer, the third device layer defining an aperture disposed between the inlet channel and the outlet channel, the aperture having a first width; and
   a filter element having a second height and a second width, the filter element being disposed substantially within the microfluidic outlet channel adjacent to the aperture;
   wherein the second height is greater than the first height, the second width is areater than the first width, and the filter element is compressively retained between the second device layer and the third device layer.

2. The device of claim 1 wherein at least one of the first device layer, second device layer, and the third device layer comprises a polymeric material.

3. The device of claim 1 wherein the third device layer is flexible.

4. The device of claim 1 wherein at least one of the first device layer, the second device layer, and the third device layer comprises self-adhesive tape.

5. The multi-layer microfluidic device of claim 1 wherein the filter element comprises a material selected from the group consisting of: papers, polymers, and glass fibers.

6. The device of claim 1, further comprising a coating applied to the filter element.

7. The device of claim 1 wherein the filter element is multi-directional.

8. The device of claim 1 wherein:
the first device layer is a first stencil layer having a first thickness with the inlet channel defined through the entire thickness of the first device layer;
the second device layer is a second stencil layer having a second thickness with the outlet channel defined through the entire thickness of the second device layer; and
the first height is equal to the thickness of the second device layer.

9. The device of claim 8, further comprising a first cover layer and a second cover layer, wherein at least one of the first cover layer and the second cover layer defines a fluidic port in fluid communication with the inlet channel.

10. The device of claim 1 wherein the outlet channel has a variable width, and at least a portion of the outlet channel is wider than the second width.

11. The device of claim 1 wherein the inlet channel has a third width, and the third width is greater than the first width.

12. A microfluidic device comprising:
a first device layer defining a microfluidic inlet channel;
a second device layer defining a microfluidic outlet channel, the outlet channel having a first height;
a third device layer disposed between the first device layer and the second device layer, the third device layer defining an aperture having a first width; and
a filter element disposed substantially within the microfluidic outlet channel and substantially centered along the aperture, the filter element having a second height and a second width;
wherein the second height is greater than the first height, the second width is greater than the first width, and the third device layer is joined between the first device layer and second device layer such that a portion of the third layer sealingly engages the filter element.

13. The device of claim 12 wherein at least one of the first device layer, the second device layer, and the third device layer comprises a polymeric material.

14. The device of claim 12 wherein at least one of the first device layer, the second device layer, and the third device layer comprises self-adhesive tape.

15. The device of claim 12 wherein the third device layer is flexible.

16. The device of claim 12 wherein the filter element comprises a material selected from the group consisting of: papers, polymers, and glass fibers.

17. The device of claim 12, further comprising a coating applied to the filter element.

18. The device of claim 12 wherein the filter element is multi-directional.

19. The device of claim 12 wherein:
the first device layer is a first stencil layer having a first thickness with the inlet channel defined through the entire thickness of the first device layer;
the second device layer is a second stencil layer having a second thickness with the outlet channel defined through the entire thickness of the second device layer; and
the first height is equal to the thickness of the second device layer.

20. The device of claim 19, further comprising a first cover layer and a second cover layer, wherein at least one of the first cover layer and the second cover layer defines a fluidic port in fluid communication with the inlet channel.

21. The device of claim 12 wherein the outlet channel has a variable width, and at least a portion of the outlet channel is wider than the second width.

22. The device of claim 12 wherein the inlet channel has a third width, and the third width is greater than the first width.

23. A microfluidic device comprising:
a first device layer defining a first channel;
a second device layer defining a second channel;
a third device layer disposed between the first device layer and the second device layer, the third device layer defining an aperture having a first width; and
a filter element compressively fixed against the third device layer adjacent to the aperture, the filter element having a second width that is greater than the first width;
wherein the first channel, the aperture, the filter element, and the second channel define a fluid flow path for the passage of a fluid through the device such that substantially all of the fluid within the fluid flow path traverses the filter element.

24. The device of claim 23 wherein at least one of the first device layer and the second device layer comprises a polymeric material.

25. The device of claim 23 wherein at least one of the first device layer and the second device layer comprises self-adhesive tape.

26. The device of claim 23 wherein the filter element comprises a material selected from the group consisting of: papers, polymers, and glass fibers.

27. The device of claim 23, further comprising a coating applied to the filter element.

28. The device of claim 23 wherein the filter element is multi-directional.

29. The device of claim 23 wherein:
the first device layer is a first stencil layer having a first thickness with the inlet channel defined through the entire thickness of the first device layer;
the second device layer is a second stencil layer having a second thickness with the outlet channel defined through the entire thickness of the second device layer; and
the first height is equal to the thickness of the second device layer.

30. The device of claim 29, further comprising a first cover layer and a second cover layer, wherein at least one of the first cover layer and the second cover layer defines a fluidic port in fluid communication with the inlet channel.

31. The device of claim 23 wherein the outlet channel has a variable width, and at least a portion of the outlet channel is wider than the second width.

32. The device of claim 23 wherein the inlet channel has a third width, and the third width is greater than the first width.

* * * * *